United States Patent
Zhang et al.

(10) Patent No.: US 6,526,450 B1
(45) Date of Patent: *Feb. 25, 2003

(54) METHOD AND APPARATUS FOR DOMAIN NAME SERVICE REQUEST RESOLUTION

(75) Inventors: Shujin Zhang, San Mateo, CA (US); Aravind Sitaraman, Santa Clara, CA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/837,786

(22) Filed: Apr. 17, 2001

Related U.S. Application Data

(63) Continuation of application No. 09/197,329, filed on Nov. 19, 1998, now Pat. No. 6,324,585.

(51) Int. Cl.[7] .............................................. G06F 13/00
(52) U.S. Cl. ........................ 709/245; 709/227; 370/401
(58) Field of Search ................................ 709/245, 227; 370/401

(56) References Cited

U.S. PATENT DOCUMENTS

| | | | | |
|---|---|---|---|---|
| 5,884,038 A | * | 3/1999 | Kapoor ........................ | 709/220 |
| 6,092,178 A | * | 7/2000 | Jindal et al. ................... | 712/27 |
| 6,119,160 A | * | 9/2000 | Zhang et al. ................. | 709/224 |
| 6,128,279 A | * | 10/2000 | O'Neil et al. ................ | 370/229 |
| 6,205,489 B1 | * | 3/2001 | Kapoor ........................ | 709/245 |
| 6,324,585 B1 | * | 11/2001 | Zhang et al. ................. | 709/245 |
| 6,425,003 B1 | * | 7/2002 | Herzog et al. ............... | 709/223 |

\* cited by examiner

*Primary Examiner*—Kenneth R. Coulter
(74) *Attorney, Agent, or Firm*—Thelen Reid & Priest LLP; Marc Hanish

(57) ABSTRACT

A gateway is provided which resolves a DNS request in a manner that minimizes the time and bandwidth required to conduct a DNS search as well as increases the chances that a DNS request will be answered for systems in which the gateway is connected to more than one network simultaneously. The gateway performs this by: comparing the domain name query of the DNS request to the domain name of each accessible network; altering the DNS request so that the destination address of the DNS request corresponds to a DNS server within the first matching accessible network, if an accessible network is found whose domain name matches the domain name query; forwarding the DNS request to the first matching accessible network if an accessible network is found whose domain name matches the domain name query; and either forwarding the unaltered DNS request to a network specified by a user if none of the domain names of the accessible networks match the domain name query of the DNS request or forwarding the unaltered DNS request to the largest accessible network unaltered if none of the domain names of the accessible networks match the domain name query of the DNS request.

44 Claims, 7 Drawing Sheets

METHOD AND APPARATUS FOR DOMAIN NAME SERVICE REQUEST RESOLUTION

This Application is a Continuation of Ser. No. 09/197,329 filed Nov. 19, 1998, now U.S. Pat. No. 6,324,585.

BACKGROUND OF THE INVENTION

1. Field Of The Invention

The present invention relates to the field of computer networks. More particularly, the present invention relates to a method and an apparatus for resolving a Domain Name Service request in a system where it is possible for the user to connect to more than one network at a time.

2. The Background

The Transmission Control Protocol/Internet Protocol (TCP/IP) is a common networking protocol which has become even more popular during the rise of the Internet. Sending or receiving information using the TCP/IP protocol requires encapsulating information into packets. Each packet includes a header and a payload. The header contains information related to the handling of the payload by a receiving host or routing device, while the payload contains part or all of the user information. The information in the header includes the sender's and the recipient's addresses and is used to route the packet through the Internet until the packet is received by a host having an IP address that matches the packet's destination address (when referring to the source address and destination address of a packet, the source address and destination address are commonly referred to as "SA" and "DA", respectively). This enables users to accurately send and receive information with each other through their respective host computers.

By implementing a protocol common to all devices using the Internet, users may send and receive information with other users on the Internet in a seamless manner regardless of geographic location or the type of host and/or interconnected network used. While IP addresses themselves are in numerical form, in order to make navigating the sea of addresses simpler, the Domain Name Service (DNS) was formed. DNS enables the central managing of host names to IP addresses. It is actually a distributed database which allows for the dissemination of new host information as needed. There are a great many DNS servers distributed throughout the Internet, and most large Internet Service Providers (ISPs) maintain their own DNS servers.

FIG. 1 is a diagram illustrating the DNS hierarchy, which is similar to that of a computer file system. At the top of the hierarchy is the root domain 50, which includes a group of root servers to service the top-level domains. The top level domains are separated into organizational and geographical domains. Many countries have their own top-level domains, such as .uk for the United Kingdom, .de for Germany, and .jp for Japan (not shown). The United States has no country-specific top-level domain, but is the main user of the six organizational top-level domains, which are net for network support organizations 52, .gov for government agencies 54, .mil for military users 56, .org for not for profit organizations 58, .com for commercial enterprises 60, and .edu for educational facilities 62. There are also a near infinite number of lower level domains. Each level of domain names may have another level of domain names below it. For example, a lower level domain work 64 may be located under the .com domain 60, and the lower level domain .univ 66 may be located under the .edu domain 62. At the lowest level are the hosts. For example, the host labeled overtime 68 may be located under the .work sub-domain under the .com domain while the host labeled vax 70 may be located under the .univ sub-domain under the .edu domain. The proper way to read these two DNS host names would then be overtime.work.com and vax.univ.edu.

The steps of locating an IP address from a host, sub-domain, and domain name proceeds as in the following example. If a user in the vax.univ.edu domain wishes to contact a user with the user name sun in the work.com domain, the first step is to contact its own DNS server. Therefore, if the vax.univ.edu host is configured with a DNS server at the IP address 133.3.1.3, the user sends a DNS request to that IP address. The DNS server then searches for the entry in its database. Generally, a DNS server maintains only a database of host addresses (or sub-domain names) within its own subnet. Therefore, the DNS server would look for an IP address corresponding to the domain/sub-domain combination .univ.edu. It may or may not have information that precise. It may only have information regarding the IP address of the .com domain and not the .work.com domain. If it has information about the IP address of the DNS server of the .workcom domain, it then contacts the .work.com DNS server and requests the IP address of the precise user it wishes to contact in the .work.com domain. If however, the DNS server associated with the vax. univ. edu host only has information about the address of the DNS server of the .com domain, it returns only that address, and then recursively navigates down the branches of DNS servers in the .com domain until it locates the address it needs (in the present example, it only searches down one level, but in more complicated hierarchies it may need to search through many levels of DNS servers).

This system has worked well in the past. However, recently it has become possible for a user to connect to two or more networks simultaneously through a single connection, such as a Point-to-Point Protocol (PPP) connection. FIG. 2 is a diagram illustrating a system in which a user connects to a multiple networks using a single connection. User 80 maintains a PPP connection 82 to a gateway 84 (most likely maintained by an ISP). Gateway 84 maintains a first connection (either a primary PPP connection or a secondary connection) to a first network 86. Gateway 84 also maintains a second connection (a secondary connection) to a second network 88. Other network connections may be established as additional secondary connections. In these types of systems, a dilemma occurs in determining how the DNS request is to be sent. The user machine may not know through which network to send the DNS request. Recursive searching through DNS servers can be very time consuming and traffic intensive, and therefore an incorrect choice may result in the slower and less efficient processing of the request. Additionally, some of the connected networks may not be able to pass the DNS request to a correct address. This can occur if the network connection is an intranet, or other local network, which does not have a connection to the Internet. Passing a DNS request to such an intranet may result in the DNS request never arriving at its destination, if the DNS request cannot be answered by the intranet. Additionally, passing a private DNS request to a hostile network may allow the hostile network to impersonate the network domain, creating a security risk.

What is needed is a solution which allows a DNS request to be directed to the network that will minimize the time and traffic required to conduct the DNS search as well as increase the chances that the DNS request will be answered in a system in which the user is connected to more than one network simultaneously.

What is further needed is a solution that provides a deterministic way to resolve a DNS request which minimizes security risks.

SUMMARY OF THE INVENTION

A gateway is provided which resolves a DNS request in a manner that minimizes the time and bandwidth required to conduct a DNS search as well as increases the chances that a DNS request will be answered for systems in which the gateway is connected to more than one network simultaneously. The gateway performs this by: comparing the domain name query of the DNS request to the domain name of each accessible network; altering the DNS request so that the destination address of the DNS request corresponds to a DNS server within the first matching accessible network, if an accessible network is found whose domain name matches the domain name query; forwarding the DNS request to the first matching accessible network if an accessible network is found whose domain name matches the domain name query; and either forwarding the unaltered DNS request to a network specified by a user if none of the domain names of the accessible networks match the domain name query of the DNS request or forwarding the unaltered DNS request to the largest accessible network unaltered if none of the domain names of the accessible networks match the domain name query of the DNS request.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In accordance with a presently preferred embodiment of the present invention, the components, process steps, and/or data structures are implemented using a gateway device. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed herewith.

Figure 1:
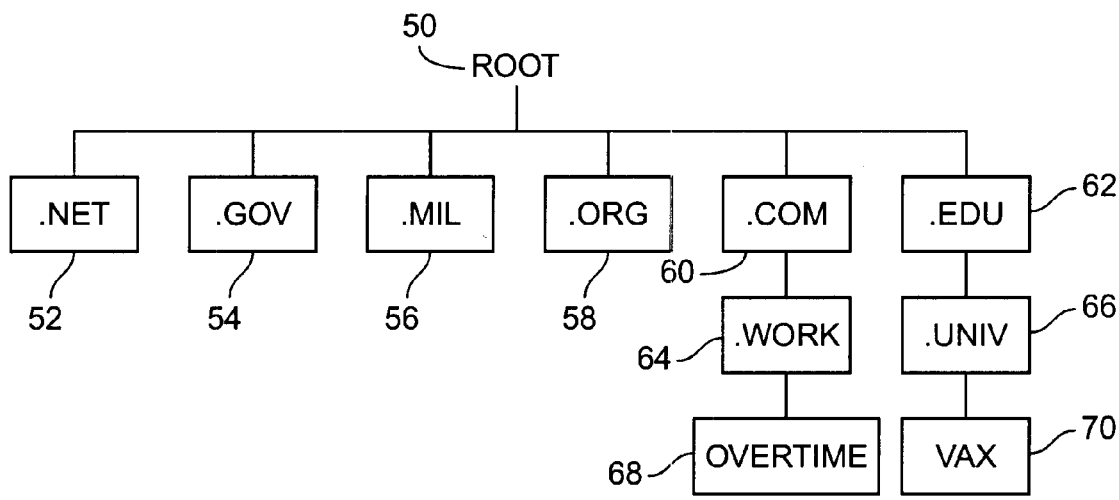
FIG. 1 is a diagram illustrating the DNS hierarchy.
Figure 2:
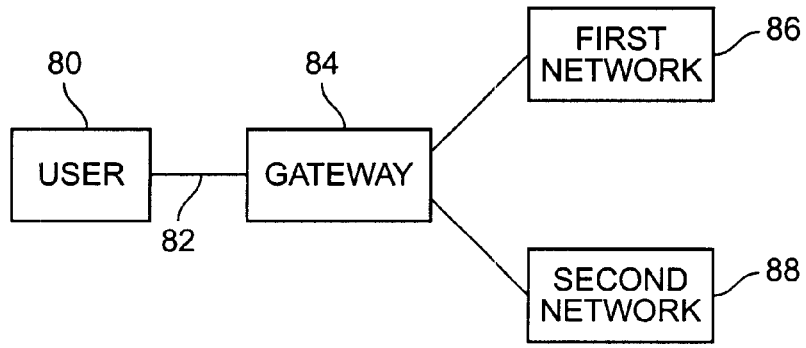
FIG. 2 is a diagram illustrating a system in which a user connects to a multiple networks using a single connection.
Figure 3:
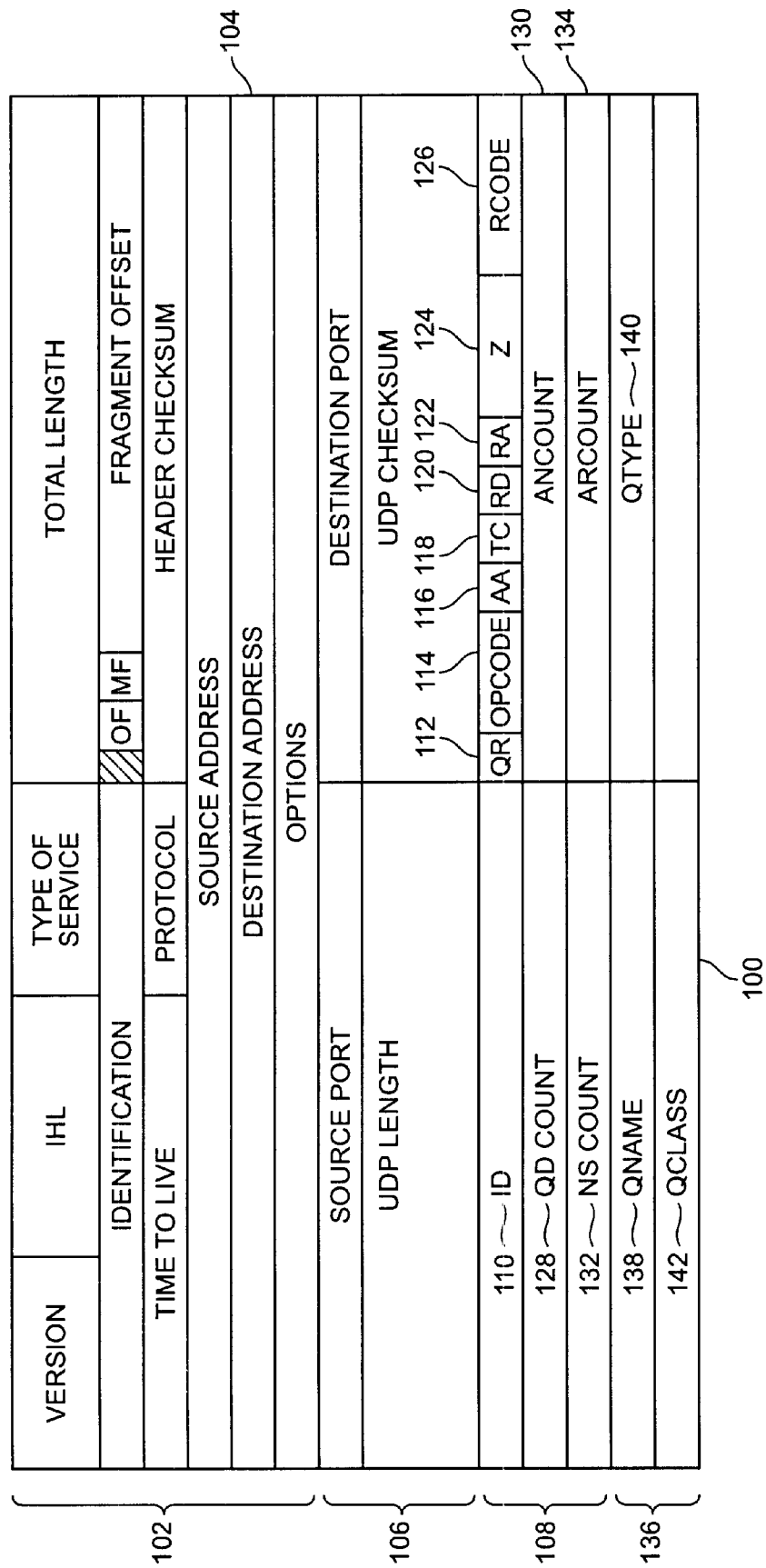
FIG. 3 is a diagram illustrating a DNS request packet in accordance with a presently preferred embodiment of the present invention.

FIG. 3 is a diagram illustrating a DNS request packet in accordance with a presently preferred embodiment of the present invention. DNS request packet 100 contains an IP header portion 102, which has many fields typical of an IP header, including a destination address field 104, which contains a destination address, or the address to which the packet is heading. DNS request packet also contains a User Datagram Protocol (UDP) packet header. UDP is an Internet protocol on the same level as TCP and allows an application to send a message to one of several applications running in the destination machine. It is commonly utilized in DNS communications. DNS request 100 also contains a DNS header 108.

DNS header 108 contains an ID field 110, which is a 16 bit identifier assigned by the program that generates the query. The identifier is copied in the corresponding reply and may be used by the requester to match up replies to outstanding queries. A QR field 112 is a one bit field that specifies whether the message is a query or a response. An Opcode field 114 is a four bit field that specifies the kind of query in the message, including a standard query, and inverse query , or a server status request, among others. An AA field 116 is valid in responses, specifying that the responding name server is an authority for the domain name in question. A TC field 118 specifies whether the message was truncated due to length greater than that permitted on the transmission channel. An RD field 120 is set in a query and copied in the response to direct the name server to pursue the query recursively. An RA field 122 is set in a response to denote whether recursive query support is available in the name server. Z field 124 is reserved for future use. An Rcode field 126 is set in responses to denote a response code indicating various types of errors that may have occurred. A QDCount field 128 is an unsigned 16 bit integer specifying the number of entries in the question section. An ANCount field 130 is an unsigned 16 bit integer specifying the number of resource records in the answer section. An NSCount field 132 is an unsigned 16 bit integer specifying the number of name server resource records in the authority records section. An ARCount field 134 is an unsigned 16 bit integer specifying the number of resource records in the additional records section.

The DNS request body 136 contains a QNAME field 138. This field contains a domain name represented as a sequence of labels, where each label is a length octet followed by a number of octets. The domain name terminates with the zero length octet for the null label of the root. This field has a variable size, despite the fact that it is depicted in FIG. 3 as merely 16 bits. A QType field 140 is a two octet code which specifies the type of the query. A QClass field 142 is a two octet code that specifies the class of the query.

Figure 4:
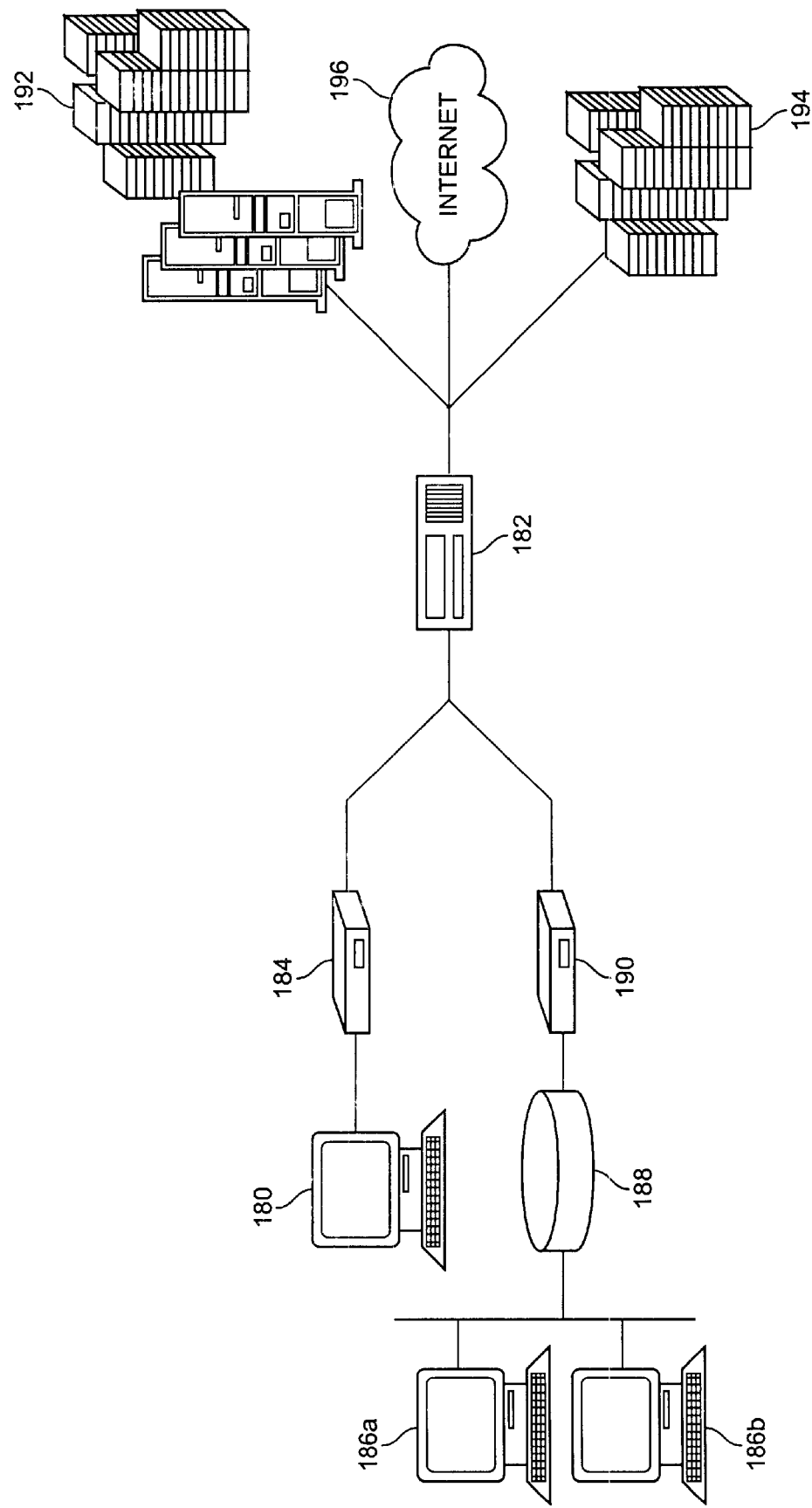
FIG. 4 is a diagram illustrating the use of a gateway to couple multiple networks.

A presently preferred embodiment of the present invention may utilize a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application. FIG. 4 is a diagram illustrating the use of a gateway to couple multiple networks. Computer 180 connects to gateway 182 through a modem 184, while computers 186a and 186b couple to a hub 188, then through modem 190 to gateway 182. Gateway 182 may then interface computers 180, 186a, and 186b to multiple networks. These may include a first corporate intranet 192, a second corporate intranet 194, and the Internet 196.

Figure 5:
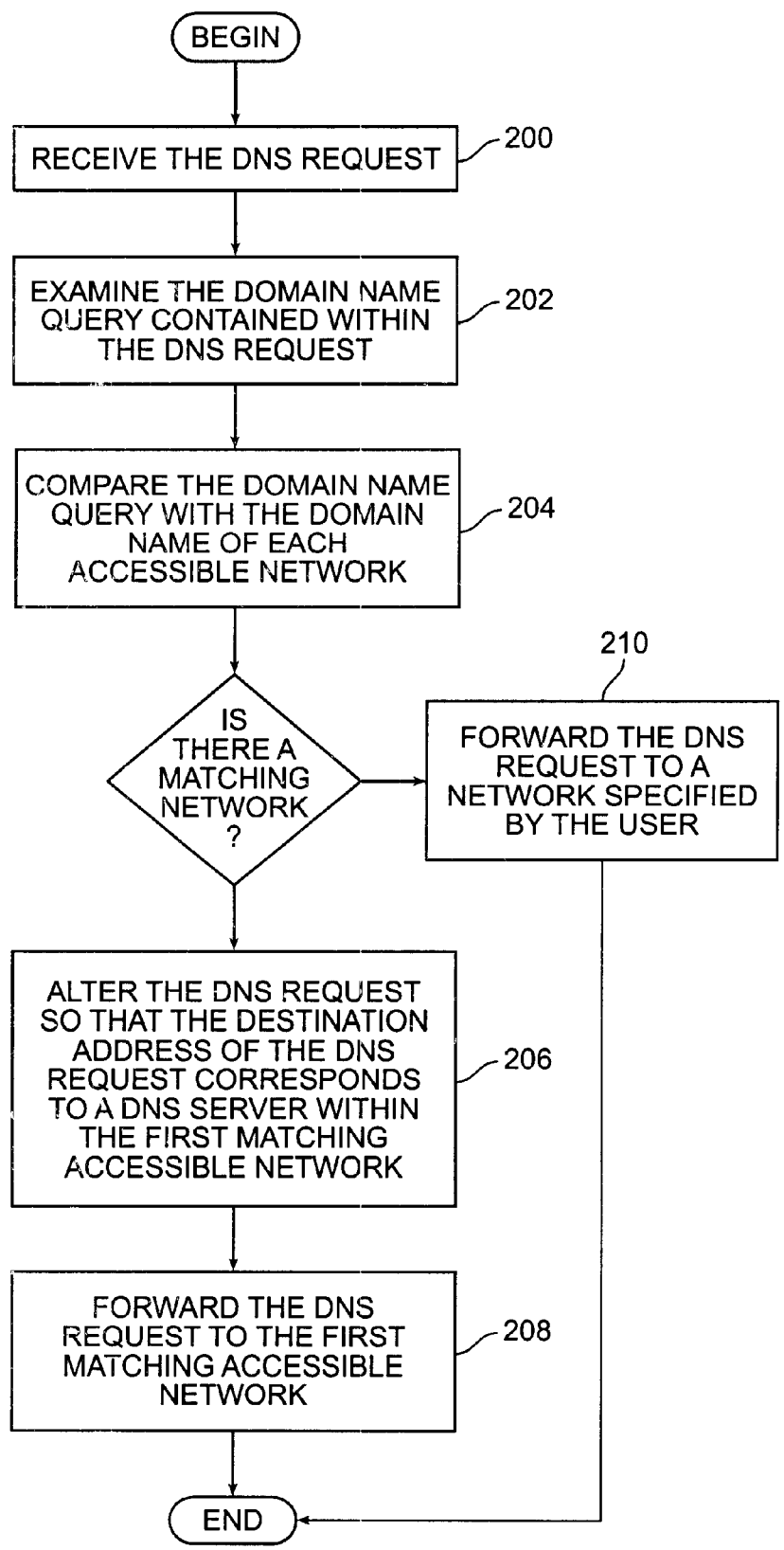
FIG. 5 is a flow diagram illustrating a method for resolving a Domain Name Service (DNS) request in a system with more than one accessible network according to a presently preferred embodiment of the present invention.

A method for resolving a Domain Name Service (DNS) request in a system with more than one accessible network according to a presently preferred embodiment of the present invention is illustrated in the flow diagram of FIG. 5. At 200, a DNS request is received. At 202, the domain name query contained within the DNS request is examined. Referring to FIG. 3, this domain name query would most likely be contained in the QNAME field 136 and may comprise a series of octets. At 204, the domain name query contained within the DNS request is compared to the domain name of each accessible network. This may be performed in a variety of ways. In a preferred embodiment, however, the gateway maintains a list of the currently accessible networks. The domain name query contained within the DNS request may then be compared with the domain names associated with each network on this list to determine if there is a match. If a match is found with any of the accessible networks, at 206 the DNS request is altered so that the destination address of the DNS request corresponds to a DNS server within the first matching accessible network. The gateway may maintain a listing of the DNS server corresponding to each accessible network, thus the list may be referred to during this step. Then, at 208, the DNS request is forwarded to the first matching network. If, on the other hand, no matching network was found, at 210 the DNS request may be forwarded to a network specified by the user. This may be accomplished several different ways. The user may be prompted to select a network when the request is generated. However, this takes up valuable time during the request generation phase. It is more likely that the user will simply set up a default network, where all DNS request packets will be forwarded if no matching network is found.

The list of accessible networks may be ordered from smallest to largest. This may be accomplished by examining the network masks of the accessible networks in the list. A network mask is a pattern of bits used to accept or reject bit patterns from a network identification. The network mask also may indicate the size of the network, a smaller network mask corresponding to a larger network. However, it is also possible that the ordering of the accessible networks may be performed outside the gateway, such as in an Authentication, Authorization, and Accounting (AAA) server, and the gateway simply retrieves this information from the AAA server.

Figure 6:
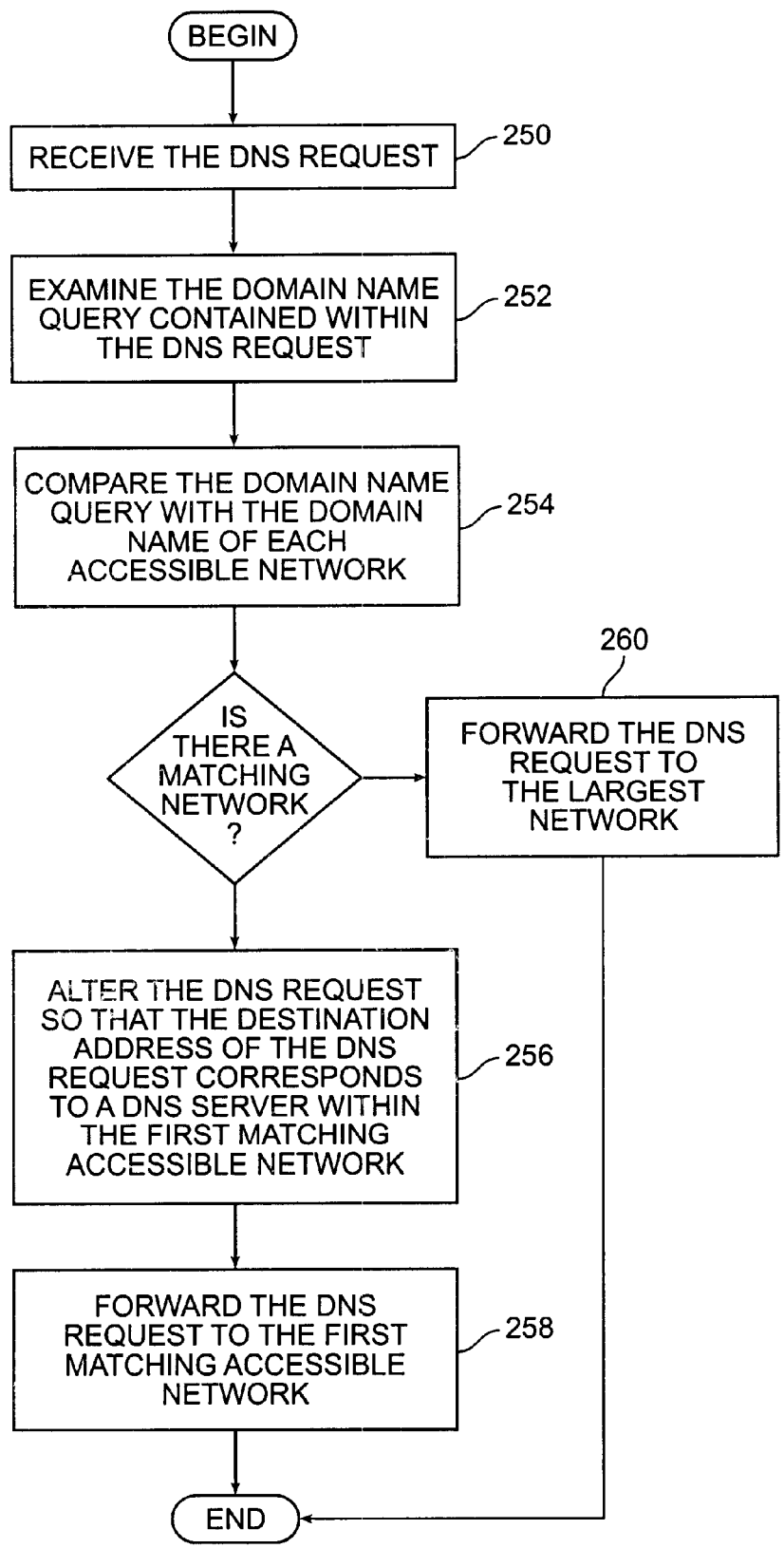
FIG. 6 is a flow diagram illustrating a method for resolving a Domain Name Service (DNS) request in a system with more than one accessible network according to another presently preferred embodiment of the present invention.

A method for resolving a Domain Name Service (DNS) request in a system with more than one accessible network according to another embodiment of the present invention is illustrated in the flow diagram of FIG. 6. At 250, a DNS request is received. At 252, the domain name query contained within the DNS request is examined. Referring to FIG. 3, this domain name would most likely be contained in the QNAME field 136 and may comprise a series of octets. At 254, the domain name query contained within the DNS request is compared to the domain name of each accessible network. This may be performed in a variety of ways. In a preferred embodiment, however, the gateway maintains a list of the currently accessible networks. The domain name query contained within the DNS request may then be compared with the domain name associated with each network on this list to determine if there is a match. If a match is found with any of the accessible networks, at 256 the DNS request is altered so that the destination address of the DNS request corresponds to DNS server within the first matching accessible network. The gateway may maintain a listing of the DNS server corresponding to each accessible network, thus the list may be referred to during this step. This information may be obtained from an external device. Then, at 258, the DNS request is forwarded to the first matching network. If, on the other hand, no matching network was found, the process moves to 260, where the DNS request is forwarded to the largest accessible network unaltered.

The list of accessible networks may be ordered from smallest to largest. This may be accomplished by examining the network masks of the accessible networks in the list. If such an ordered list exists, then at 260 the process need simply to forwards the DNS request top the last network on the list. By forwarding the DNS request to the largest accessible network, then there is the greatest chance of the DNS request packet eventually getting to the Internet, where it will be able to locate an appropriate DNS server for resolution of the domain name, as larger networks have a greater chance of having their own connection to the Internet than smaller networks.

Figure 7:
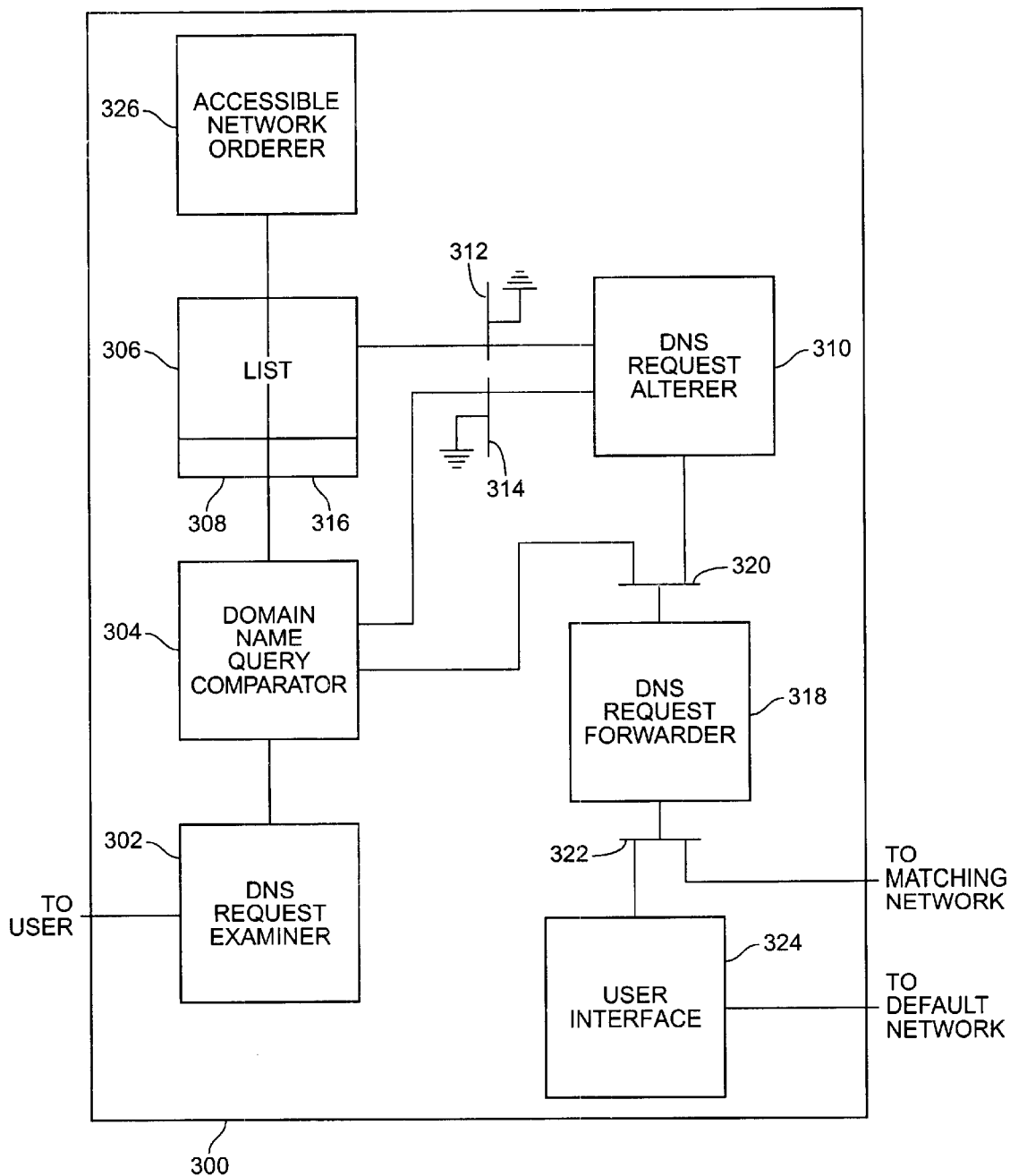
FIG. 7 is a block diagram illustrating a gateway capable of resolving a Domain Name Service request in accordance with a presently preferred embodiment of the present invention.

FIG. 7 is a block diagram illustrating a gateway capable of resolving a Domain Name Service request in accordance with a presently preferred embodiment of the present invention. The DNS request is received by the gateway 300 and passed to a DNS request examiner 302, where the domain name query of the DNS request is examined. Referring to FIG. 3, this domain name would most likely be contained within the QNAME field 136 and may comprise a series of octets. The DNS request examiner 302 is coupled to a domain name query comparator 304. The domain name query comparator compares the domain name query of the DNS request to the domain name of each accessible network. To accomplish this, the domain name query comparator may be coupled to a list 306 of currently accessible networks. The list may contain an entry 308 for each network indicating the network's domain name. A DNS request alterer 310 may be coupled to the list 306 and to the domain name query comparator 304 through switches 312 and 314 respectively. The switches 312 and 314 only allow the DNS request alterer 310 to be coupled to the list 306 and domain name query comparator 304 when the domain name comparator 304 found an accessible network whose domain name matches the domain name query. If that was the case, the DNS request alterer 310 alters the DNS request so that the destination address of the DNS request corresponds to a DNS server within the first matching accessible network. The list 306 may contain an entry 316 indicating such a DNS server within each accessible network.

A DNS request forwarder 318 may be coupled to either said DNS request alterer 310 or said domain name query comparator 304 using a switch 320. If an accessible network was found whose domain name matches the domain name query, then the switch 320 couples the DNS request forwarder 318 to the DNS request alterer 310. In that case, the DNS request forwarder is also coupled to the first matching accessible network using switch 322. Thus, the DNS request forwarder 318 forwards the DNS request to the first matching accessible network. If none of the domain names of the accessible networks match the domain name query of the DNS request, the DNS request forwarder 318 is coupled to said domain name query comparator 304 and to a default network, to receive the DNS request unaltered from the domain name query comparator 304 and forward it to a default network. A user interface 324 may be supplied to allow a user to configure which network is the default network. The user interface 324 may also be capable of receiving real-time input from the user to determine where to send a DNS request.

The list 306 may be an ordered list of accessible networks, from smallest to largest. This may be accomplished by coupling an accessible network orderer 326 to the list 306, which examines the network masks of the accessible networks in the list and rearranges the list so that the networks with the smallest network masks are at the end.

Figure 8:
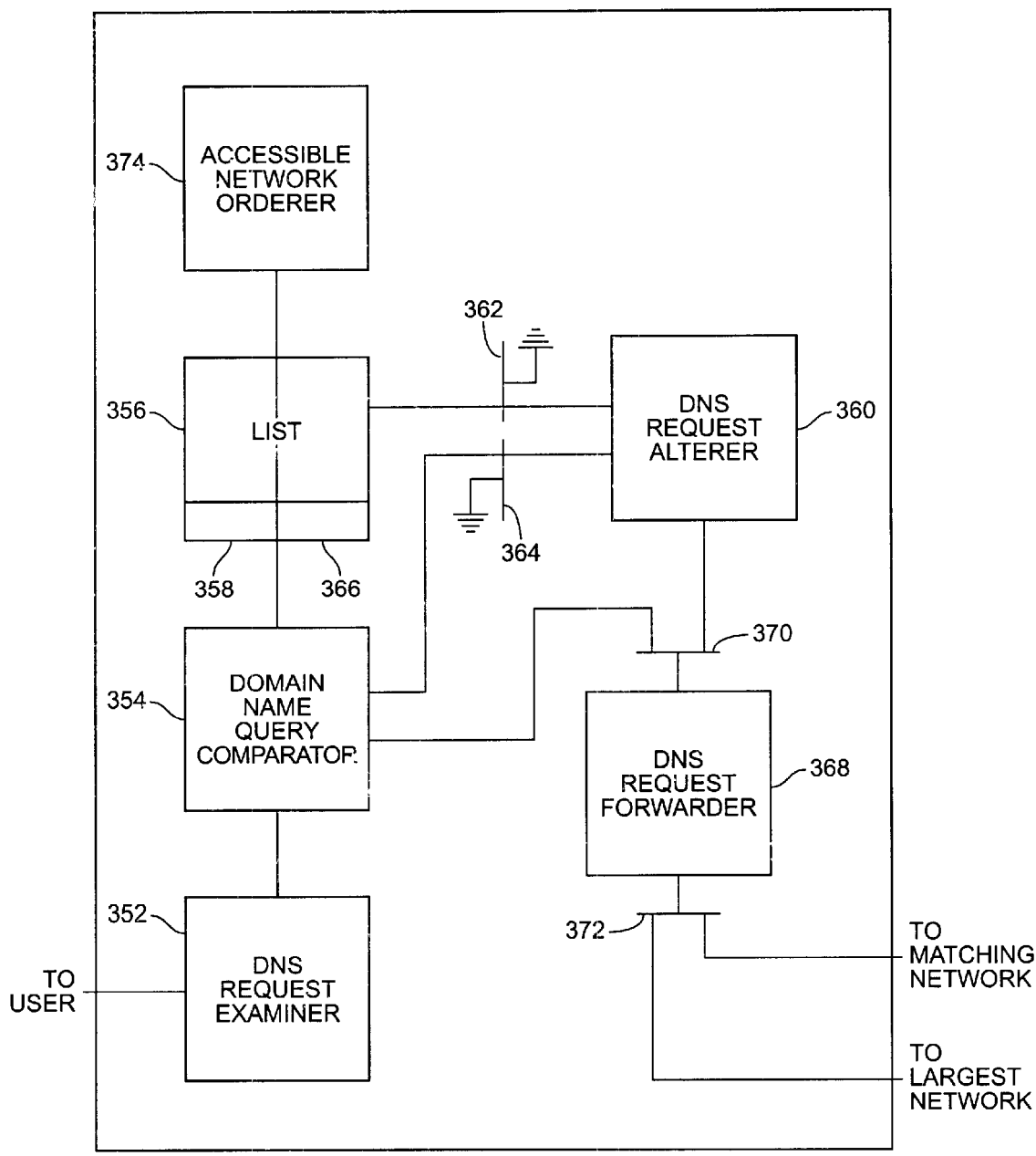
FIG. 8 is a block diagram illustrating a gateway capable of resolving a Domain Name Service request in accordance with another embodiment of the present invention.

FIG. 8 is a block diagram illustrating a gateway capable of resolving a Domain Name Service request in accordance with another embodiment of the present invention. The DNS request is received by the gateway 350 and passed to a DNS request examiner 352, where the domain name query of the DNS request is examined. Referring to FIG. 3, this domain name would most likely be contained within the QNAME field 136 and may comprise a series of octets. The DNS request examiner 352 is coupled to a domain name query comparator 354. The domain name query comparator compares the domain name query of the DNS request to the domain name of each accessible network. To accomplish this, the domain name query comparator may be coupled to a list 356 of currently accessible networks. The list may contain an entry 358 for each network indicating the network's domain name. A DNS request alterer 360 may be coupled to the list 306 and to the domain name query comparator 354 through switches 362 and 364 respectively. The switches 362 and 364 only allow the DNS request alterer 360 to be coupled to the list 356 and domain name query comparator 354 when the domain name comparator 354 found an accessible network whose domain name matches the domain name query. If that was the case, the DNS request alterer 360 alters the DNS request so that the destination address of the DNS request corresponds to a DNS server within the first matching accessible network. The list 356 may contain an entry 366 indicating such a DNS server within each accessible network.

A DNS request forwarder 368 may be coupled to either said DNS request alterer 360 or said domain name query comparator 354 using a switch 370. If an accessible network was found whose domain name matches the domain name query, then the switch 370 couples the DNS request forwarder 368 to the DNS request alterer 360. In that case, the DNS request forwarder is also coupled to the first matching accessible network using switch 372. Thus, the DNS request forwarder 368 forwards the DNS request to the first matching accessible network. If none of the domain names of the accessible networks match the domain name query of the DNS request, the DNS request forwarder 318 is coupled to said domain name query comparator 354 and to the largest accessible network, to receive the DNS request unaltered from the domain name query comparator 354 and forward it to the largest accessible network.

The list 356 may be an ordered list of accessible networks, from smallest to largest. This may be accomplished by coupling an accessible network orderer 374 to the list 356, which examines the network masks of the accessible networks in the list and re-arranges the list so that the networks with the smallest network masks are at the end. This allows the DNS request forwarder 368 to simply forward the DNS request to the last network on the list 356 if none of the domain names of the accessible networks match the domain name query of the DNS request.

By searching through the accessible networks and forwarding the DNS request to a network with a matching domain name, the gateway ensures that most DNS request packets will be resolved with the minimum amount of bandwidth and in the minimum amount of time. By allowing a user to set a default network to send requests for which no match can be found, it provides flexibility to the user in ensuring that the request is handled correctly. Alternatively, by forwarding an unmatched DNS request to the largest accessible network, the gateway ensures the greatest chance that the request will ultimately be resolved.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for resolving a Domain Name Service (DNS) request having a domain name query and a destination address in a gateway with more than one accessible network, each accessible network having a domain name, the method comprising:

comparing the domain name query of said DNS request to the domain name of at least one accessible network;

altering the destination address of said DNS request to correspond with a DNS server within a matching accessible network when an accessible network is found whose domain name matches said domain name query;

forwarding said DNS request to said matching accessible network when said matching accessible network is found; and forwarding the unaltered DNS request to a default network when no matching accessible network is found.

2. The method of claim 1, further comprising examining the domain name query contained within said DNS request.

3. The method of claim 1 wherein said comparing comprises traversing a list of accessible networks, said list also including the domain name of at least one accessible network.

4. The method of claim 3, further comprising ordering said list by size of the accessible networks, with the smallest being first and the largest being last.

5. The method of claim 4 wherein said ordering comprises comparing the network masks of said accessible networks, wherein a smaller network mask indicates a larger network.

6. The method of claim 3 wherein said list further comprises a DNS server address corresponding to said at least one accessible network and said altering comprises altering the DNS request so that the destination address of the DNS packet is the DNS server address corresponding to said matching accessible network from said list.

7. A method for resolving a Domain Name Service (DNS) request having a domain name query and a destination address in a gateway with more than one accessible network, each accessible network having a domain name, the method comprising:

comparing the domain name query of said DNS request to the domain name of at least one accessible network;

altering the destination address of said DNS request to correspond with a DNS server within a matching accessible network when an accessible network is found whose domain name matches said domain name query;

forwarding said DNS request to said matching accessible network when said matching accessible network is found; and forwarding the unaltered DNS request to the largest accessible network unaltered when no matching accessible network is found.

8. The method of claim 7, further comprising examining the domain name query contained within said DNS request.

9. The method of claim 7 wherein said comparing comprises traversing a list of accessible networks, said list also including the domain name of at least one accessible network.

10. The method of claim 9, further comprising ordering said list by size of the accessible networks, with the smallest being first and the largest being last and said forwarding the DNS request to the largest accessible network comprises forwarding the DNS request to the last network on said list.

11. The method of claim 10 wherein said ordering comprises comparing the network masks of said accessible networks, wherein a smaller network mask indicates a larger network.

12. An apparatus capable of resolving a Domain Name Service (DNS) request having a domain name query and a destination address, the apparatus comprising:
- a domain name query comparator capable of receiving a list of currently accessible networks and their corresponding domain names;
- a DNS request alterer capable of receiving said list and coupled to said domain name query comparator when a matching accessible network is found whose domain name matches said domain name query; and
- a DNS request forwarder coupled to said domain name query comparator when no matching accessible network is found, said DNS request forwarder further coupled to said DNS request alterer when a matching accessible network is found, said DNS request forwarder further coupled to said matching accessible network when said matching accessible network is found, said DNS request forwarder further coupled to a default network when no matching accessible network is found.

13. The apparatus of claim 12, further comprising a user interface coupled to said DNS request forwarder and configured to specify said default network.

14. The apparatus of claim 12, further comprising a DNS request examiner coupled to said domain name query comparator.

15. The apparatus of claim 12 wherein said list is ordered by size of the accessible networks, with the smallest being first and the largest being last.

16. The apparatus of claim 15, further comprising an accessible network orderer.

17. The apparatus of claim 12 wherein said list further comprises a DNS server address corresponding to at least one accessible network.

18. An apparatus capable of resolving a Domain Name Service (DNS) request having a domain name query and a destination address, the apparatus comprising:
- a domain name query comparator capable of receiving a list of currently accessible networks and their corresponding domain names;
- a DNS request alterer capable of receiving said list and coupled to said domain name query comparator when a matching accessible network is found whose domain name matches said domain name query; and
- a DNS request forwarder coupled to said domain name query comparator when no matching accessible network is found, said DNS request forwarder further coupled to said DNS request alterer when a matching accessible network is found, said DNS request forwarder further coupled to said matching accessible network when said matching accessible network is found, said DNS request forwarder further coupled to the largest accessible network when no matching accessible network is found.

19. The apparatus of claim 18, further comprising a DNS request examiner coupled to said domain name query comparator.

20. The apparatus of claim 18 wherein said list is ordered by size of the accessible networks, with the smallest being first and the largest being last.

21. The apparatus of claim 20, further comprising an accessible network orderer.

22. The apparatus of claim 18 wherein said list further comprises a DNS server address corresponding to at least one accessible network.

23. A program storage device readable by a machine, embodying a program of instructions executable by the machine to perform a method to resolve a Domain Name Service (DNS) request having a domain name query and a destination address in a gateway with more than one accessible network, each accessible network having a domain name, said method comprising:
- comparing the domain name query of said DNS request to the domain name of at least one accessible network;
- altering the destination address of said DNS request to correspond with a DNS server within a matching accessible network when an accessible network is found whose domain name matches said domain name query;
- forwarding said DNS request to said matching accessible network when said matching accessible network is found; and
- forwarding the unaltered DNS request to a default network when no matching accessible network is found.

24. The program storage device of claim 23 wherein said method further comprises examining the domain name query contained within said DNS request.

25. The program storage device of claim 23 wherein said comparing comprises traversing a list of accessible networks, said list also including the domain name of at least one accessible network.

26. The program storage device of claim 25 wherein said method further comprises ordering said list by size of the accessible networks, with the smallest being first and the largest being last.

27. The program storage device of claim 26 wherein said ordering comprises comparing the network masks of said accessible networks, wherein a smaller network mask indicates a larger network.

28. The program storage device of claim 25 wherein said list further comprises a DNS server address corresponding to said at least one accessible network and said altering comprises altering the DNS request so that the destination address of the DNS packet is the DNS server address corresponding to said matching accessible network from said list.

29. A program storage device readable by a machine, embodying a program of instructions executable by the machine to perform a method to resolve a Domain Name Service (DNS) request having a domain name query and a destination address in a gateway with more than one accessible network, each accessible network having a domain name, said method comprising:
- comparing the domain name query of said DNS request to the domain name of at least one accessible network;
- altering the destination address of said DNS request to correspond with a DNS server within a matching accessible network when an accessible network is found whose domain name matches said domain name query;
- forwarding said DNS request to said matching accessible network when said matching accessible network is found; and forwarding the unaltered DNS request to the largest accessible network unaltered when no matching accessible network is found.

30. The program storage device of claim 29 wherein said method further comprises examining the domain name query contained within said DNS request.

31. The program storage device of claim 29 wherein said comparing comprises traversing a list of accessible networks, said list also including the domain name of at least one accessible network.

32. The program storage device of claim 31 wherein said method further comprises ordering said list by size of the accessible networks, with the smallest being first and the largest being last and said forwarding the DNS request to the largest accessible network comprises forwarding the DNS request to the last network on said list.

33. The program storage device of claim 32 wherein said ordering comprises comparing the network masks of said accessible networks, wherein a smaller network mask indicates a larger network.

34. An apparatus for resolving a Domain Name Service (DNS) request having a domain name query and a destination address in a gateway with more than one accessible network, each accessible network having a domain name, the apparatus comprising:
- means for comparing the domain name query of said DNS request to the domain name of at least one accessible network;
- means for altering the destination address of said DNS request to correspond with a DNS server within a matching accessible network when an accessible network is found whose domain name matches said domain name query;
- means for forwarding said DNS request to said matching accessible network when said matching accessible network is found; and
- means for forwarding the unaltered DNS request to a default network when no matching accessible network is found.

35. The apparatus of claim 34, further comprising means for examining the domain name query contained within said DNS request.

36. The apparatus of claim 34 wherein said means for comparing comprises means for traversing a list of accessible networks, said list also including the domain name of at least one accessible network.

37. The apparatus of claim 36, further comprising means for ordering said list by size of the accessible networks, with the smallest being first and the largest being last.

38. The apparatus of claim 37 wherein said means for ordering comprises comparing the network masks of said accessible networks, wherein a smaller network mask indicates a larger network.

39. The apparatus of claim 36 wherein said list further comprises a DNS server address corresponding to said at least one accessible network and said means for altering comprises means for altering the DNS request so that the destination address of the DNS packet is the DNS server address corresponding to said matching accessible network from said list.

40. An apparatus for resolving a Domain Name Service (DNS) request having a domain name query and a destination address in a gateway with more than one accessible network, each accessible network having a domain name, the apparatus comprising:
- means for comparing the domain name query of said DNS request to the domain name of at least one accessible network;
- means for altering the destination address of said DNS request to correspond with a DNS server within a matching accessible network when an accessible network is found whose domain name matches said domain name query;
- means for forwarding said DNS request to said matching accessible network when said matching accessible network is found; and
- means for forwarding the unaltered DNS request to the largest accessible network unaltered when no matching accessible network is found.

41. The apparatus of claim 40, further comprising means for examining the domain name query contained within said DNS request.

42. The apparatus of claim 40 wherein said means for comparing comprises means for traversing a list of accessible networks, said list also including the domain name of at least one accessible network.

43. The apparatus of claim 42, further comprising means for ordering said list by size of the accessible networks, with the smallest being first and the largest being last and said means for forwarding the DNS request to the largest accessible network comprises means for forwarding the DNS request to the last network on said list.

44. The apparatus of claim 43 wherein said means for ordering comprises means for comparing the network masks of said accessible networks, wherein a smaller network mask indicates a larger network.

* * * * *

UNITED STATES PATENT AND TRADEMARK OFFICE
CERTIFICATE OF CORRECTION

PATENT NO.    : 6,526,450 B1
DATED         : February 25, 2003
INVENTOR(S)   : Shujin Zhang, Aravind Sitaraman and Shuxian Lou It is certified that error appears in the above-identified patent and that said Letters Patent is hereby corrected as shown below:

<u>Column 2,</u>
Line 21, replace ".workcom" with -- .work.com --.

Signed and Sealed this

First Day of July, 2003

JAMES E. ROGAN
*Director of the United States Patent and Trademark Office*